United States Patent
Nakajima et al.

(10) Patent No.: US 7,697,491 B2
(45) Date of Patent: Apr. 13, 2010

(54) RETRANSMISSION CONTROL OF BURST TRANSMISSION BY WIRELESS COMMUNICATION APPARATUS

(75) Inventors: Tetsu Nakajima, Yokohama (JP); Tomoko Adachi, Urayasu (JP); Masahiro Takagi, Tokyo (JP); Tomoya Tandai, Tokyo (JP); Yoriko Utsunomiya, Tokyo (JP); Yasuyuki Nishibayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 863 days.

(21) Appl. No.: 11/135,358

(22) Filed: May 24, 2005

(65) Prior Publication Data

US 2005/0265297 A1 Dec. 1, 2005

(30) Foreign Application Priority Data

May 28, 2004 (JP) .............................. 2004-160176

(51) Int. Cl.
*H04W 4/00* (2006.01)
*H04L 1/08* (2006.01)
*G08C 25/02* (2006.01)

(52) U.S. Cl. ....................... 370/338; 370/231; 370/235; 714/748

(58) Field of Classification Search ................. 370/338, 370/345, 389, 230, 235, 231; 714/748, 776
See application file for complete search history.

(56) References Cited

U.S. PATENT DOCUMENTS

| | | | | |
|---|---|---|---|---|
| 5,553,083 A * | 9/1996 | Miller | | 714/748 |
| 5,754,754 A * | 5/1998 | Dudley et al. | | 714/18 |
| 6,330,249 B1 * | 12/2001 | Matsuno et al. | | 370/462 |
| 6,587,453 B1 * | 7/2003 | Romans et al. | | 370/347 |
| 7,299,063 B2 * | 11/2007 | Kurihara | | 455/513 |
| 2001/0024446 A1 * | 9/2001 | Craig et al. | | 370/412 |
| 2002/0075831 A1 * | 6/2002 | Lozano | | 370/335 |
| 2002/0150048 A1 * | 10/2002 | Ha et al. | | 370/231 |
| 2002/0163888 A1 * | 11/2002 | Grinfeld | | 370/235 |

(Continued)

FOREIGN PATENT DOCUMENTS

JP        8-33070        2/1996

(Continued)

OTHER PUBLICATIONS

"Block acknowledgment", Medium Access Control Enhancements for Quality of Service, IEEE P802.11e/D8.0, Feb. 2004, Chapter 9, Section 10, pp. 86-90.

(Continued)

*Primary Examiner*—George Eng
*Assistant Examiner*—Christopher M Brandt
(74) *Attorney, Agent, or Firm*—Oblon, Spivak, McClelland, Maier & Neustadt, L.L.P.

(57) ABSTRACT

A wireless communication apparatus includes a transmitting device configured to transmit burst data of a plurality of transmission data, a receiving device configured to receive an acknowledgement status of the burst data transmitted by the transmitting device, a retransmitting device configured to control the transmitting device to retransmit any of the plurality of transmission data contained in the burst data, in accordance with the acknowledgement status received by the receiving device, and a retransmission limiting device configured to limit the retransmission for each frame exchange sequence of the burst data.

11 Claims, 10 Drawing Sheets

U.S. PATENT DOCUMENTS

| | | | |
|---|---|---|---|
| 2003/0206521 A1* | 11/2003 | Qiao | 370/230 |
| 2003/0227875 A1* | 12/2003 | Wei et al. | 370/252 |
| 2004/0179475 A1* | 9/2004 | Hwang et al. | 370/229 |
| 2005/0015703 A1* | 1/2005 | Terry et al. | 714/776 |
| 2005/0020299 A1* | 1/2005 | Malone et al. | 455/552.1 |
| 2005/0022098 A1* | 1/2005 | Vayanos et al. | 714/776 |
| 2005/0059347 A1* | 3/2005 | Haartsen | 455/41.2 |
| 2005/0083838 A1* | 4/2005 | Kandala | 370/230 |
| 2005/0100120 A1* | 5/2005 | Barton et al. | 375/347 |
| 2005/0152359 A1* | 7/2005 | Giesberts et al. | 370/389 |
| 2005/0176445 A1* | 8/2005 | Qu et al. | 455/458 |
| 2005/0286446 A1* | 12/2005 | Barber | 370/278 |
| 2006/0023717 A1* | 2/2006 | Trachtman et al. | 370/392 |
| 2006/0104201 A1* | 5/2006 | Sundberg et al. | 370/230 |
| 2006/0111103 A1* | 5/2006 | Jeong et al. | 455/434 |
| 2006/0153117 A1* | 7/2006 | Bichot et al. | 370/316 |
| 2006/0168504 A1* | 7/2006 | Meyer et al. | 714/799 |
| 2007/0171902 A1* | 7/2007 | Simonsson et al. | 370/389 |
| 2008/0037589 A1* | 2/2008 | Kliger et al. | 370/485 |

FOREIGN PATENT DOCUMENTS

JP    2003-60562    2/2003

OTHER PUBLICATIONS

U.S. Appl. No. 11/744,253, filed May 4, 2007, Nakajima, et al.

* cited by examiner

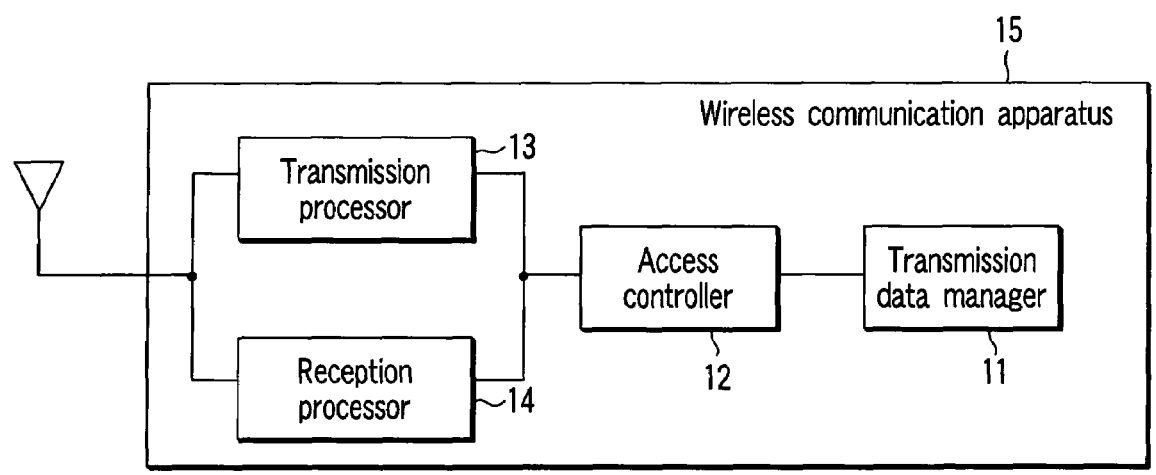
F I G. 1

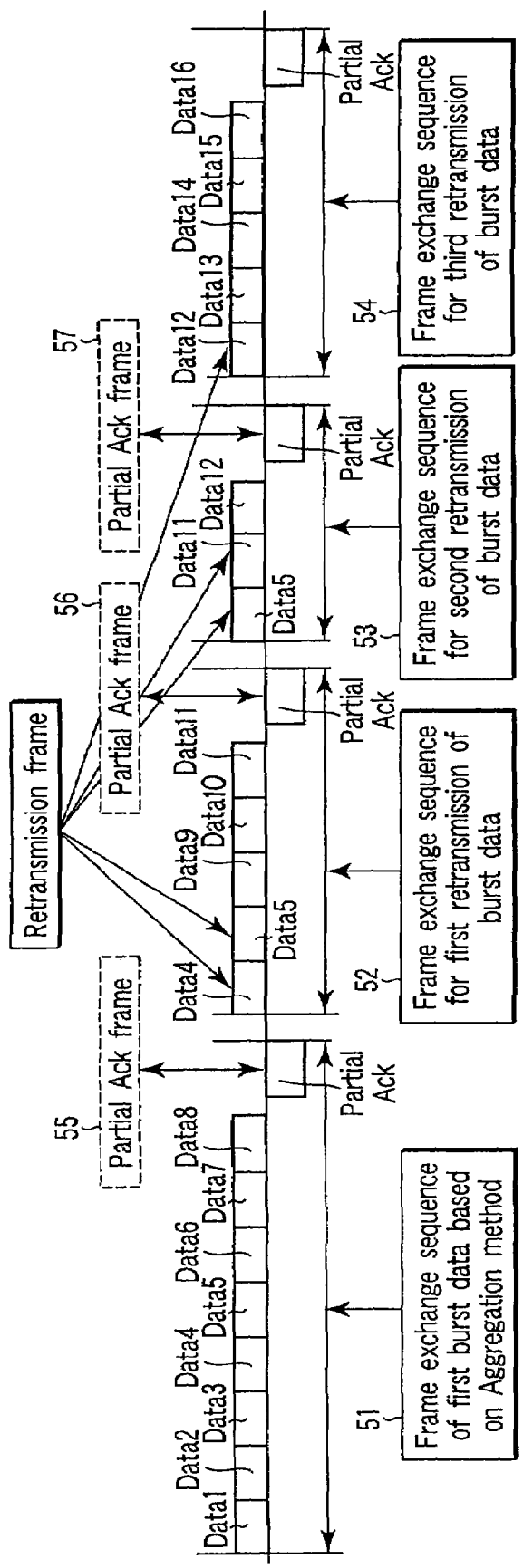
F I G. 5

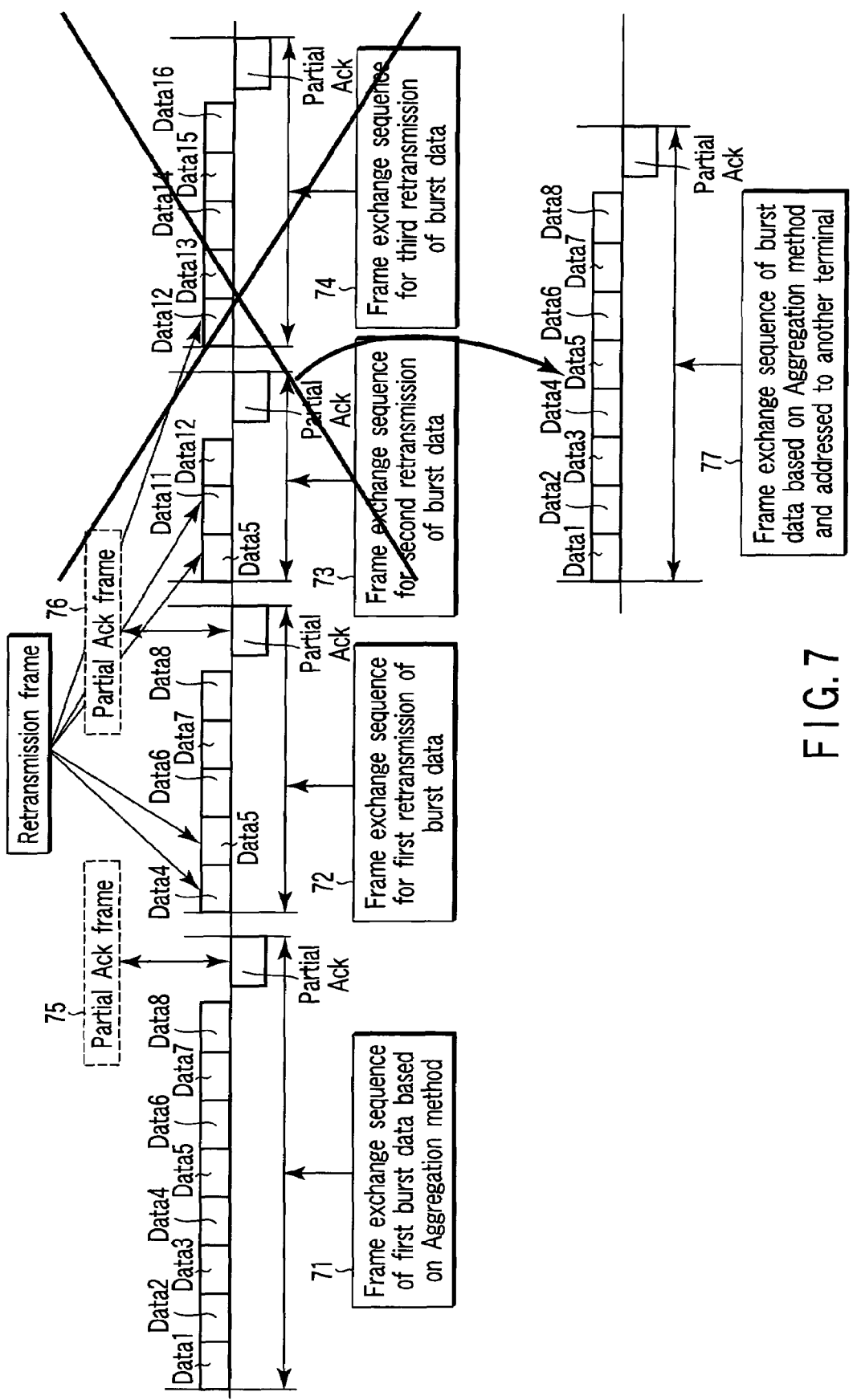
F I G. 7

RETRANSMISSION CONTROL OF BURST TRANSMISSION BY WIRELESS COMMUNICATION APPARATUS

CROSS-REFERENCE TO RELATED APPLICATIONS

This application is based upon and claims the benefit of priority from prior Japanese Patent Application No. 2004-160176, filed May 28, 2004, the entire contents of which are incorporated herein by reference.

BACKGROUND OF THE INVENTION

1. Field of the Invention

The present invention relates to a wireless communication apparatus suited to a cellphone or wireless LAN apparatus and, more particularly, to a retransmission limiting method used when a communication apparatus for wired or wireless data transmission and reception transmits a plurality of transmission data by burst transmission, and retransmits the burst data in accordance with the acknowledgement status of the burst data.

2. Description of the Related Art

In the conventional wireless communication systems of a CSMA/CA method represented by wireless LAN communication defined in the IEEE 802.11, if an Ack frame which is an acknowledgement frame for transmission data cannot be received, the transmission data is retransmitted. When each transmission data is thus retransmitted, the number of times of retransmission and lifetime unique to the transmission data are used. In this manner, the retransmission can be limited by using the number of times of retransmission of the transmission data and the time during which the data can be transmitted.

Also, Jpn. Pat. Appln. KOKAI Publication No. 2003-60562 describes the invention which controls retransmission by adjusting the frame length of a burst frame in wireless burst communication.

Unfortunately, if the retransmission limiting method for each transmission data defined in the existing IEEE 802.11 is used as the retransmission limiting method for burst transmission such as the Block Ack method defined in the conventional IEEE 802.11e, burst data transmission excessively concentrates to the same terminal.

Also, if the transmission opportunities of data having a plurality of priorities are distributed in accordance with the priorities as defined in the conventional IEEE 802.11e, transmission opportunities are excessively given to the same priority.

BRIEF SUMMARY OF THE INVENTION

Accordingly, the present invention is directed to provide a wireless communication terminal which, even when performing burst transmission and burst retransmission, can prevent excess concentration of transmission to the same terminal or the same priority, and assure bands for a plurality of terminals and a plurality of priorities.

A wireless communication apparatus according to an aspect of the present invention comprises a transmitting device configured to transmit burst data of a plurality of transmission data, a receiving device configured to receive an acknowledgement status of the burst data transmitted by the transmitting device, a retransmitting device configured to control the transmitting device to retransmit any of the plurality of transmission data contained in the burst data, in accordance with the acknowledgement status received by the receiving device, and a retransmission limiting device configured to limit the retransmission for each frame exchange sequence of the burst data.

BRIEF DESCRIPTION OF THE SEVERAL VIEWS OF THE DRAWING

FIG. 1 is a block diagram showing the arrangement of a wireless communication apparatus according to an embodiment of the present invention;

FIG. 5 is a view for explaining a burst data retransmission method based on the aggregation method;

FIG. 7 is a view for explaining a retransmission limiting method using the number of times of retransmission for each frame exchange sequence of burst data when the burst data is retransmitted by the aggregation method;

DETAILED DESCRIPTION OF THE INVENTION

Figure 2:
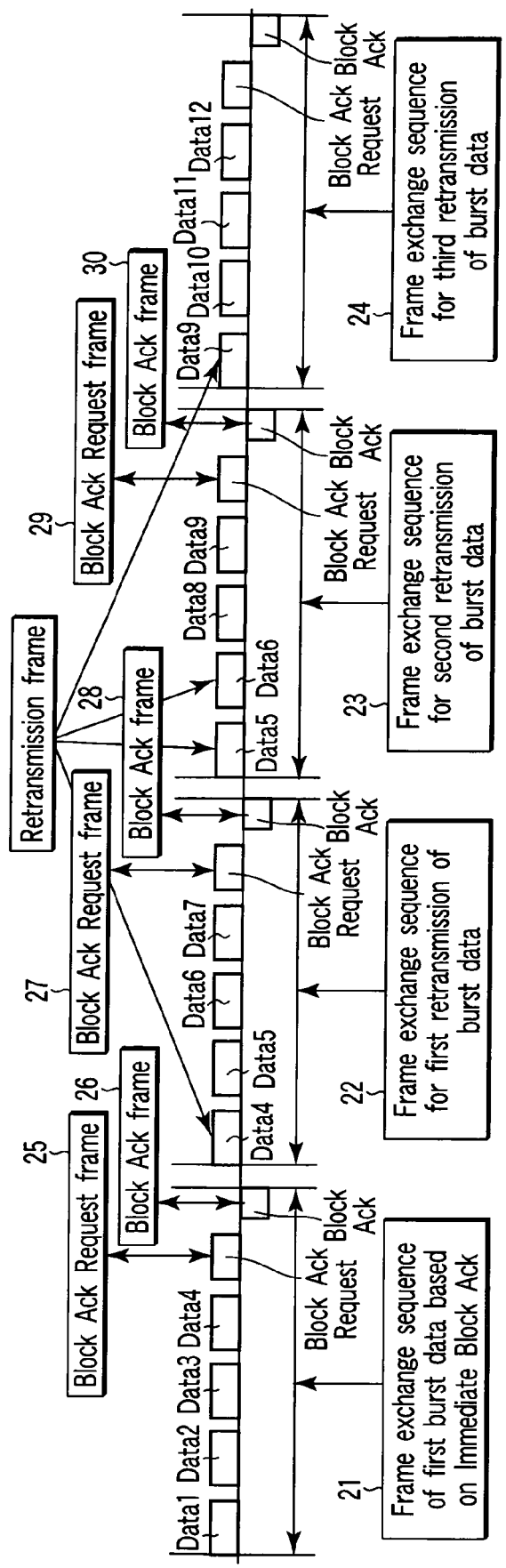
FIG. 2 is a view for explaining a burst data retransmission method based on immediate Block Ack standardized in the IEEE 802.11e.

Embodiments of the present invention will be described in detail below with reference to the accompanying drawing.

First Embodiment

An embodiment of the present invention will be explained below by taking the IEEE 802.11 as wireless LAN communication which is a communication method of a wireless communication system as an example. Note that the IEEE 802.11 wireless LAN communication method is presumably one of wireless communication methods to which the effects of the present invention can be applied, so the present invention is not limited to the IEEE 802.11 but applicable to general wireless communication methods. In this embodiment, the Block Ack method using immediate Ack defined in the IEEE 802.11e will be explained as a burst transmission communication method.

Note that a burst transmission communication method to which the present invention is applicable is not limited to the Block Ack method using immediate BlockAck method. That is, the present invention can be applied to general communication methods which perform burst-like transmission. Examples are the Block Ack method using delayed BlockAck method, the aggregation method by which a plurality of MAC frames transmitted from MAC to PHY by wireless LAN communication are collectively transmitted as one PHY frame, a method which collectively transmits a plurality of MAC frames and a plurality of PHY frames as one PHY frame, and a method which increases the error estimation accuracy by collecting a plurality of MAC frames into one PHY frame and inserting a mid preamble into the obtained frame.

As is well known, in wireless communication based on CSMA/CA, a wireless communication apparatus performs carrier sense before transmitting data packet by packet, thereby avoiding collision with packets from another terminal. In burst transmission in which a plurality of transmission data are continuously transmitted, carrier sense is performed only for the first packet (transmission data) of burst data to be transmitted by burst transmission, and no carrier sense is performed for other packets of the burst data.

In a burst transmission method using the aggregation method as burst transmission, burst transmission is performed by collecting a plurality of transmission data into one frame. Also, in a burst transmission method using the Block Ack method as burst transmission, burst transmission is performed by collecting a plurality of transmission data into an SIFS interval. After burst transmission is performed by the aggregation method or Block Ack method as described above, a Block Ack frame or Partial Ack frame is received as an acknowledgement frame of a plurality of data transmitted by the burst transmission. The Block Ack frame or Partial Ack frame has a bit map which indicates the reception status of a plurality of data included in the burst data. The transmitting side of burst transmission refers to this bit map, adds new data to the end of data which cannot be received by the receiving side of burst transmission, and retransmits the data by burst transmission. In this manner, the wireless transmission efficiency can be increased. Note that burst data may also be retransmitted when neither the Block Ack frame nor the Partial Ack frame can be received.

The embodiment of the present invention will be described below with reference to the accompanying drawing. FIG. 1 is a block diagram showing the arrangement of a wireless communication apparatus of this embodiment.

As shown in FIG. 1, a wireless communication apparatus 15 according to this embodiment comprises a transmission data manager 11, access controller 12, transmission processor 13, and reception processor 14. The transmission data manager 11 has a transmission queue for buffering transmission data, and performs retransmission limitation unique to each transmission data. The access controller 12 manages data transmission/reception timings, and performs access control, e.g., a retransmission process, in accordance with the acknowledgement status of transmission data. When a plurality of transmission data are to be transmitted by burst transmission, the access controller 12 performs retransmission limitation for each frame exchange sequence of burst data, independently of the retransmission limitation unique to each transmission data performed by the transmission data manager 11. The transmission processor 13 performs a data transmission process. The reception processor 14 performs a data reception process. The wireless communication apparatus 15 performs burst transmission by, e.g., immediate Block Ack.

FIG. 2 is a view showing a burst data retransmission method using immediate Block Ack standardized in the IEEE 802.11e.

First, a burst data retransmission method using burst transmission by immediate Block Ack defined in the IEEE 802.11e will be explained below with reference to FIG. 2. In a frame exchange sequence 21 of first burst data based on Block Ack, a burst data transmitting terminal transmits four data frames Data 1, Data 2, Data 3, and Data 4 and one Block Ack Request frame 25 at SIFS intervals, and a burst data receiving terminal receives the Block Ack Request frame 25 and, after the elapse of SIFS, returns a Block Ack frame 26 as an acknowledgement frame of the burst data. If the burst data receiving terminal can normally receive Data 1, Data 2, and Data 3 but cannot receive Data 4 in the frame exchange sequence 21 of the first burst data, the bit map of the Block Ack frame 26 indicates that Data 1, Data 2, and Data 3 are normally received. The burst data transmitting terminal having received the Block Ack frame 26 recognizes from its bit map that the transmission of Data 4 has failed, and performs first retransmission of the burst data by Block Ack.

In a frame exchange sequence 22 of the first retransmission of the burst data, the burst data transmitting terminal counts up the number of times of retransmission of Data 4, and confirms that the number of times of retransmission of Data 4 has not reached the upper limit of the number of times of retransmission of the data, and that the lifetime of Data 4 has not expired. The burst data transmitting terminal then sets a retry bit of Data 4, retransmits Data 4, and transmits three new data frames Data 5, Data 6, and Data 7 and one Block Ack Request frame 27 at SIFS intervals. The burst data receiving terminal receives the Block Ack Request frame 27 and, after the elapse of SIFS, returns a Block Ack frame 28 as an acknowledgement frame of the burst data. If the burst data receiving terminal can normally receive Data 4 and Data 7 but cannot receive Data 5 and Data 6 in the frame exchange sequence 22 of the first retransmission of the burst data, the bit map of the Block Ack frame 28 indicates that Data 4 and Data 7 are normally received. The burst data transmitting terminal having received the Block Ack frame 28 recognizes from its bit map that the transmission of Data 5 and Data 6 has failed, and performs second retransmission of the burst data by Block Ack.

In a frame exchange sequence 23 of the second retransmission of the burst data, the burst data transmitting terminal counts up the numbers of times of retransmission of Data 5 and Data 6 newly added in the first retransmission of the burst data, and confirms that the number of times of retransmission of each of Data 5 and Data 6 has not reached the upper limit of the number of times of retransmission of the data, and that the lifetime of each of Data 5 and Data 6 has not expired. The burst data transmitting terminal then sets retry bits of Data 5 and Data 6, retransmits Data 5 and Data 6, and transmits two new data frames Data 8 and Data 9 and one Block Ack Request frame 29 at SIFS intervals. The burst data receiving terminal receives the Block Ack Request frame 29 and, after the elapse of SIFS, returns a Block Ack frame 30 as an acknowledgement frame of the burst data. If the burst data receiving terminal can normally receive Data 5, Data 6, and Data 8 but cannot receive Data 9 in the frame exchange sequence 23 of the second retransmission of the burst data, the bit map of the Block Ack frame 30 indicates that Data 5, Data 6, and Data 8 are normally received. The burst data transmitting terminal having received the Block Ack frame 30 recognizes from its bit map that the transmission of Data 9 has failed, and performs third retransmission of the burst data by Block Ack.

The interval between burst data frame exchange sequences for retransmission may also be a PIFS interval if a burst data transmission source is a wireless base station and a transmission destination is a wireless terminal station. During the TXOP period of EDCA or HCCA defined in the IEEE 802.11e, it is also possible to transmit data at PIFS intervals or SIFS intervals, or to perform backoff by CSMA/CA.

If retransmission limitation using the number of times of retransmission and lifetime of each transmission data is performed as data retransmission limitation when burst transmission based on the Block Ack method is performed, the number of times of retransmission and lifetime of new data are used as described above. Accordingly, burst transmission for the same terminal or the same priority is kept performed, or downlink burst transmission from a wireless base station to a plurality of terminal stations is kept performed. This makes it impossible to perform switching to burst data transmission to another terminal or another priority, or switching to uplink data transmission from a wireless terminal station to a wireless base station by transmitting a poll frame from the wireless base station.

To solve the above problem, when burst data is to be retransmitted by immediate Block Ack, a retransmission limiting method according to the present invention uses the lifetime for each frame exchange sequence of the burst data. An embodiment based on this retransmission limiting method will be explained below with reference to FIGS. 1 and 3.

Figure 3:
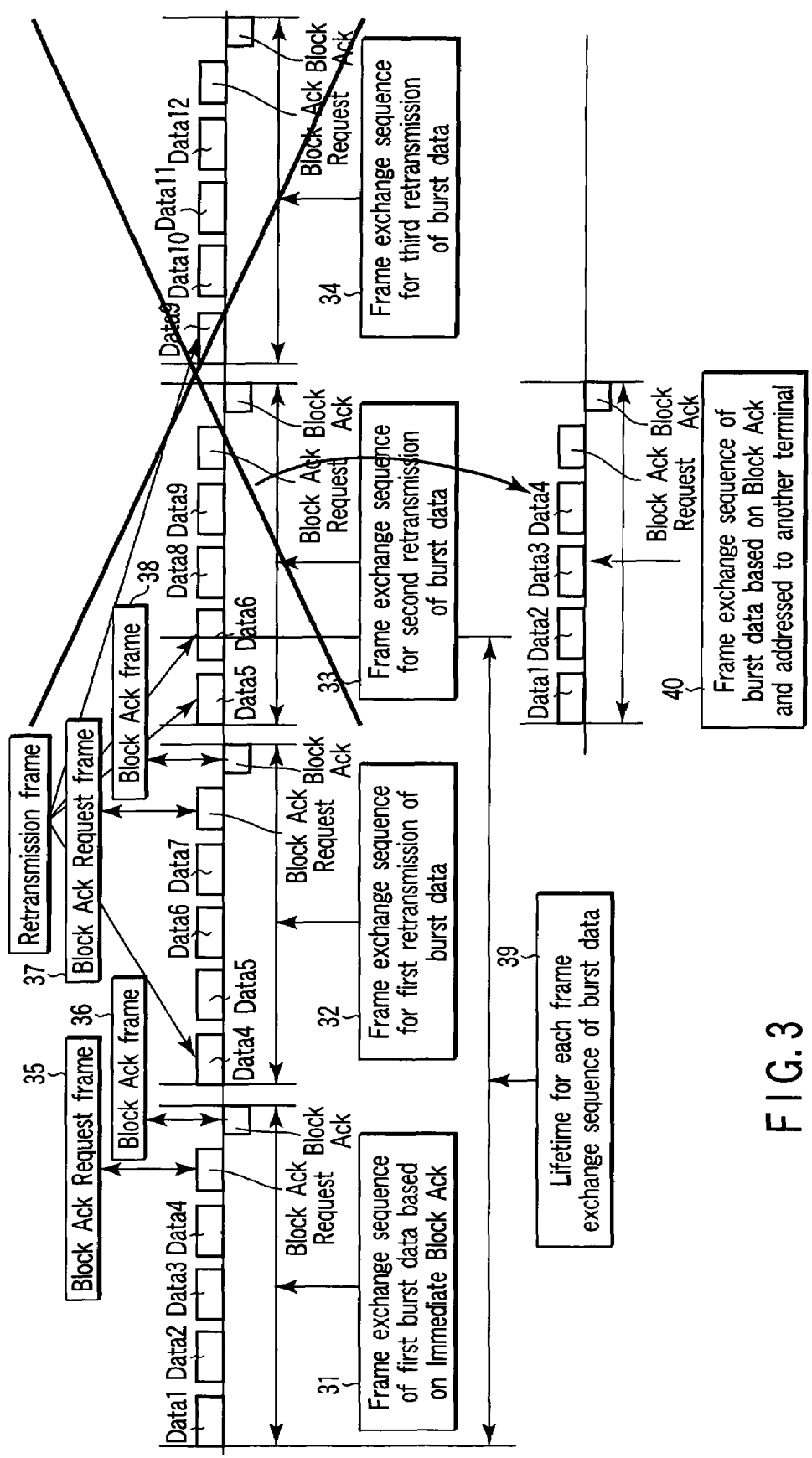
FIG. 3 is a view for explaining a retransmission limiting method using the lifetime for each frame exchange sequence of burst data when the burst data is retransmitted by immediate Block Ack.

FIG. 3 is a view showing the retransmission limiting method which uses the lifetime for each frame exchange sequence of burst data when retransmitting the burst data by immediate Block Ack.

When a frame exchange sequence 31 of first burst data based on Block Ack is started, the access controller 12 of the wireless communication apparatus 15 sets (starts) a timer of lifetime 39 for each frame exchange sequence of the burst data. In the frame exchange sequence 31 of the first burst data, a burst data transmitting terminal transmits four data frames Data 1, Data 2, Data 3, and Data 4 and one Block Ack Request frame 35 at SIFS intervals, and a burst data receiving terminal receives the Block Ack Request frame 35 and, after the elapse of SIFS, returns a Block Ack frame 36 as an acknowledgement frame of the burst data. If the burst data receiving terminal can normally receive Data 1, Data 2, and Data 3 but cannot receive Data 4 in the frame exchange sequence 31 of the first burst data, the bit map of the Block Ack frame 36 indicates that Data 1, Data 2, and Data 3 are normally received. The burst data transmitting terminal having received the Block Ack frame 36 recognizes from its bit map that the transmission of Data 4 has failed, and causes the access processor 12 to perform the following processing which checks whether first retransmission of the burst data by Block Ack can be performed.

The access controller 12 checks whether a frame exchange sequence 32 of the first retransmission of the burst data can be transmitted in the remaining time of the timer of the lifetime 39 for each frame exchange sequence of the burst data, the remaining time being set by the access controller 12 when the frame exchange sequence 31 of the first burst data based on Block Ack is started. If it is determined that the frame exchange sequence 32 of the first retransmission of the burst data can be transmitted in the remaining time of the timer of the lifetime 39 for each frame exchange sequence of the burst data, the first retransmission of the burst data is performed.

In the frame exchange sequence 32 of the first retransmission of the burst data, the burst data transmitting terminal counts up the number of times of retransmission of Data 4, and confirms that the number of times of retransmission of Data 4 has not reached the upper limit of the number of times of retransmission of the data, and that the lifetime of Data 4 has not expired. The burst data transmitting terminal then sets a retry bit of Data 4, retransmits Data 4, and transmits three new data frames Data 5, Data 6, and Data 7 and one Block Ack Request frame 37 at SIFS intervals. The burst data receiving terminal receives the Block Ack Request frame 37 and, after the elapse of SIFS, returns a Block Ack frame 38 as an acknowledgement frame of the burst data. If the burst data receiving terminal can normally receive Data 4 and Data 7 but cannot receive Data 5 and Data 6 in the frame exchange sequence 32 of the first retransmission of the burst data, the bit map of the Block Ack frame 38 indicates that Data 4 and Data 7 are normally received. The burst data transmitting terminal having received the Block Ack frame 38 recognizes from its bit map that the transmission of Data 5 and Data 6 has failed, and causes the access processor 12 to perform the following processing which checks whether second retransmission of the burst data by Block Ack can be performed.

The access controller 12 checks whether a frame exchange sequence 33 of the second retransmission of the burst data can be transmitted in the remaining time of the timer of the lifetime 39 for each frame exchange sequence of the burst data, the remaining time being set by the access controller 12 when the frame exchange sequence 31 of the first burst data based on Block Ack is started. If, as shown in FIG. 3, it is determined that the frame exchange sequence 33 of the second retransmission of the burst data cannot be transmitted in the remaining time of the timer of the lifetime 39 for each frame exchange sequence of the burst data, the burst data retransmission process is interrupted, and the operation advances to a process of transmitting burst data to another terminal on the basis of Block Ack by a frame exchange sequence 40 of the burst data. This operation after the burst data retransmission is interrupted need not be limited to the process of transmitting burst data to another terminal on the basis of Block Ack. That is, the operation may also advance to, e.g., burst data transmission to another priority of the same terminal by Block Ack, burst data transmission to another terminal by a method other than Block Ack, burst data transmission to another priority of the same terminal by a method other than Block Ack, downlink TXOP transmission from a base station to a terminal by the HCCA method of the IEEE 802.11e, QoS Cf-Poll frame transmission which starts uplink TXOP transmission by the HCCA method of the IEEE 802.11e, or data transmission by the CSMA/CA access method such as the DCF method of the IEEE 802.11 or the EDCA method of the IEEE 802.11e.

Also, when the access controller 12 checks whether the frame exchange sequence 33 of the second retransmission of the burst data can be transmitted on the basis of the remaining time of the timer of the lifetime 39 for each frame exchange sequence of the burst data, even though the frame exchange sequence 33 of the second retransmission of the burst data cannot be entirely transmitted, data transmission within the transmittable range can be performed depending on the remaining time of the timer of the lifetime 39 for each frame exchange sequence of the burst data, if, for example, there is a time remaining during which Data 5 and Data 6 found by the bit map of the Block Ack frame 38 to have been unsuccessfully transmitted can be transmitted by Block Ack Policy and a Block Ack Request frame and Block Ack frame can be exchanged, there is a time remaining during which Data 5, Data 6, and new data Data 8 can be transmitted by Block Ack Policy and a Block Ack Request frame and Block Ack frame can be exchanged, there is a time remaining during which Data 5 and Data 6 can be transmitted and received by Normal Ack, or there is a time remaining during which only Data 5 can be transmitted and received by Normal Ack.

In this embodiment, four data are put in one burst as burst data based on immediate Block Ack. However, the number of data which can be put in one burst is not limited to four. That is, the number of data which can be put in one burst can be increased if the bit map of the Block Ack frame is sufficient. It is also possible to increase the bit map if it is insufficient for the number of data. When burst data is to be retransmitted in this embodiment, the number of data to be put in one burst need not be equal to the number of data initially put in the first burst data. That is, the number of data can be changed whenever retransmission is performed.

As described above, transmission data which cannot be retransmitted due to the remaining time of the timer of the lifetime 39 for each frame exchange sequence of burst data is returned to the transmission data manager 11 of the wireless communication apparatus 15, and whether to discard the transmission data is determined by using the number of times of retransmission and the lifetime uniquely managed for the transmission data. Even though the timer of the lifetime 39 for each frame exchange sequence of the burst data has expired, if the number of times of retransmission uniquely managed for the transmission data has not exceeded the upper limit of the number of times of retransmission, and if the lifetime uniquely managed for the transmission data has not expired, the transmission data is returned to the transmission queue of the transmission data manager 11. If the number of times of retransmission uniquely managed for the transmission data has exceeded the upper limit of the number of times of retransmission, or if the lifetime uniquely managed for the transmission data has expired, the data is discarded without being returned to the transmission queue.

In this embodiment as described above, retransmission of burst data by burst transmission can be limited for each frame exchange sequence of the burst data, so scheduling calculations can be performed by taking account of burst data retransmission. Also, a necessary band can be ensured for a QoS request which changes from one terminal to another or from one application to another.

Second Embodiment

The second embodiment is basically the same as the first embodiment except that in burst data retransmission limitation in the first embodiment, the number of times of retransmission for each frame exchange sequence of burst data is used instead of the lifetime 39 for each frame exchange sequence of burst data. Therefore, differences from the first embodiment will be mainly described below. The basic configuration of a wireless communication apparatus is the same as shown in FIG. 1.

The problem described in the first embodiment arises if retransmission limitation using the number of times of retransmission and lifetime of each transmission data is performed as data retransmission limitation when Block Ack burst transmission is performed.

To solve the above problem, when burst data is to be retransmitted by immediate Block Ack, a retransmission limiting method according to the present invention uses the number of times of retransmission for each frame exchange sequence of the burst data. An embodiment based on this retransmission limiting method will be explained below with reference to FIGS. 1 and 4.

Figure 4:
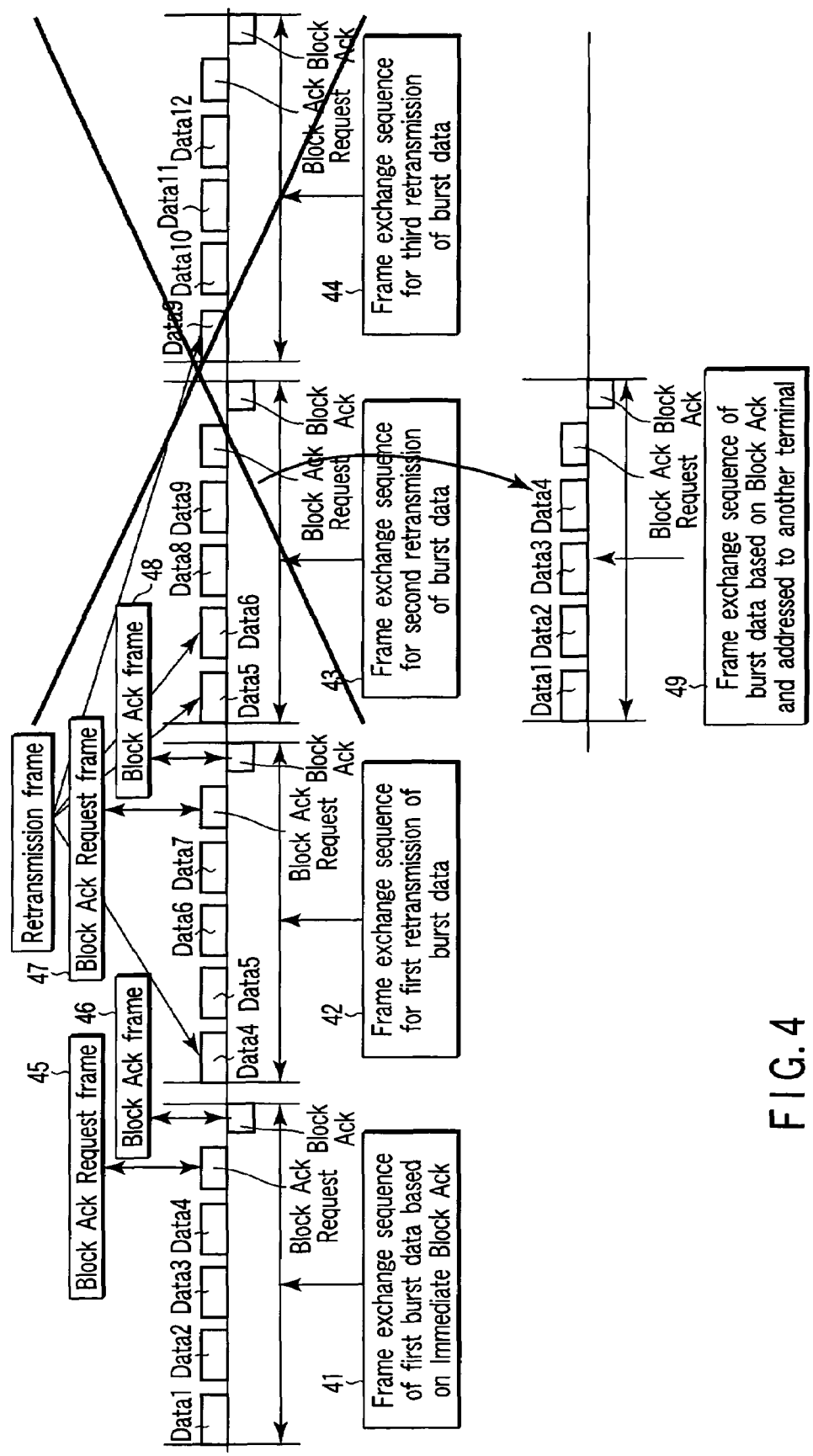
FIG. 4 is a view for explaining a retransmission limiting method using the number of times of retransmission for each frame exchange sequence of burst data when the burst data is retransmitted by immediate Block Ack.

FIG. 4 is a view showing the retransmission limiting method which uses the number of times of retransmission for each frame exchange sequence of burst data when retransmitting the burst data by immediate Block Ack.

In this embodiment, the upper limit of the number of times of retransmission for each frame exchange sequence of burst data is two, and burst data is retransmitted only once. However, the upper limit of the number of times of retransmission for each frame exchange sequence of burst data is not limited to two. That is, the upper limit may also be increased or no retransmission need be performed at all depending on the form of use.

When a frame exchange sequence 41 of first burst data based on Block Ack is started, an access controller 12 of a wireless communication apparatus 15 initializes the number of times of retransmission for each frame exchange sequence of the burst data (i.e., sets the number of times of retransmission to 0). In the frame exchange sequence 41 of the first burst data, a burst data transmitting terminal transmits four data frames Data 1, Data 2, Data 3, and Data 4 and one Block Ack Request frame 45 at SIFS intervals, and a burst data receiving terminal receives the Block Ack Request frame 45 and, after the elapse of SIFS, returns a Block Ack frame 46 as an acknowledgement frame of the burst data. If the burst data receiving terminal can normally receive Data 1, Data 2, and Data 3 but cannot receive Data 4 in the frame exchange sequence 41 of the first burst data, the bit map of the Block Ack frame 46 indicates that Data 1, Data 2, and Data 3 are normally received. The burst data transmitting terminal having received the Block Ack frame 46 recognizes from its bit map that the transmission of Data 4 has failed, and causes the access processor 12 to check whether first retransmission of the burst data by Block Ack can be performed.

The access controller 12 counts up the number of times of retransmission for each frame exchange sequence of the burst data from 0 to 1, and checks whether the number of times of retransmission for each frame exchange sequence of the burst data has exceeded two, which is the upper limit of the number of times of retransmission for each frame exchange sequence of the burst data. Since the number of times of retransmission for each frame exchange sequence of the burst data has not exceeded two as the upper limit of the number of times of retransmission, the first retransmission of the burst data is performed.

In a frame exchange sequence 42 of the first retransmission of the burst data, the burst data transmitting terminal counts up the number of times of retransmission of Data 4, and confirms that the number of times of retransmission of Data 4 has not reached the upper limit of the number of times of retransmission of the data, and that the lifetime of Data 4 has not expired. The burst data transmitting terminal then sets a retry bit of Data 4, retransmits Data 4, and transmits three new data frames Data 5, Data 6, and Data 7 and one Block Ack Request frame 47 at SIFS intervals. The burst data receiving terminal receives the Block Ack Request frame 47 and, after the elapse of SIFS, returns a Block Ack frame 48 as an acknowledgement frame of the burst data. If the burst data receiving terminal can normally receive Data 4 and Data 7 but cannot receive Data 5 and Data 6 in the frame exchange sequence 42 of the first retransmission of the burst data, the bit map of the Block Ack frame 48 indicates that Data 4 and Data 7 are normally received. The burst data transmitting terminal having received the Block Ack frame 48 recognizes from its bit map that the transmission of Data 5 and Data 6 has failed, and causes the access processor 12 to check whether second retransmission of the burst data by Block Ack can be performed.

The access controller 12 counts up the number of times of retransmission for each frame exchange sequence of the burst data from 1 to 2, and checks whether the number of times of retransmission for each frame exchange sequence of the burst data has exceeded two, which is the upper limit of the number of times of retransmission for each frame exchange sequence of the burst data. Since the number of times of retransmission for each frame exchange sequence of the burst data is equal to two as the upper limit of the number of times of retransmission, the burst data retransmission process is interrupted, and the operation advances to a process of transmitting burst data to another terminal on the basis of Block Ack by a frame exchange sequence 49 of the burst data. This operation after the burst data retransmission is interrupted need not be limited to the process of transmitting burst data to another terminal on the basis of Block Ack. That is, the operation may also advance to, e.g., burst data transmission to another priority of the same terminal by Block Ack, burst data transmission to another terminal by a method other than Block Ack, burst data transmission to another priority of the same terminal by a method other than Block Ack, downlink TXOP transmission from a base station to a terminal by the HCCA method of the IEEE 802.11e, QoS Cf-Poll frame transmission which starts uplink TXOP transmission by the HCCA method of the IEEE 802.11e, or data transmission by the CSMA/CA access method such as the DCF method of the IEEE 802.11 or the EDCA method of the IEEE 802.11e.

In this embodiment, four data are put in one burst as burst data based on immediate Block Ack. However, the number of data which can be put in one burst is not limited to four. That is, the number of data which can be put in one burst can be increased if the bit map of the Block Ack frame is sufficient. It is also possible to increase the bit map if it is insufficient for the number of data. When burst data is to be retransmitted in this embodiment, the number of data to be put in one burst need not be equal to the number of data initially put in the first burst data. That is, the number of data can be changed whenever retransmission is performed.

As described above, transmission data which cannot be retransmitted because the number of times of retransmission for each frame exchange sequence of burst data is exceeded is returned to a transmission data manager 11 of the wireless communication apparatus 15, and whether to discard the transmission data is determined by using the number of times of retransmission and the lifetime uniquely managed for the transmission data. Even though the upper limit of the number of times of retransmission for each frame exchange sequence of the burst data is exceeded, if the number of times of retransmission uniquely managed for the transmission data has not exceeded the upper limit of the number of times of retransmission, and if the lifetime uniquely managed for the transmission data has not expired, the transmission data is returned to a transmission queue of the transmission data manager 11. If the number of times of retransmission uniquely managed for the transmission data has exceeded the upper limit of the number of times of retransmission, or if the lifetime uniquely managed for the transmission data has expired, the data is discarded without being returned to the transmission queue.

In this embodiment as described above, retransmission of burst data by burst transmission can be limited for each frame exchange sequence of the burst data, so scheduling calculations can be performed by taking account of burst data retransmission. Also, a necessary band can be ensured for a QoS request which changes from one terminal to another or from one application to another.

Third Embodiment

The third embodiment is basically the same as the first embodiment except that burst transmission based on the aggregation method is used instead of burst transmission based on immediate Block Ack of the first embodiment. Therefore, differences from the first embodiment will be mainly described below. The basic configuration of a wireless communication apparatus is the same as shown in FIG. 1.

Figure 6:
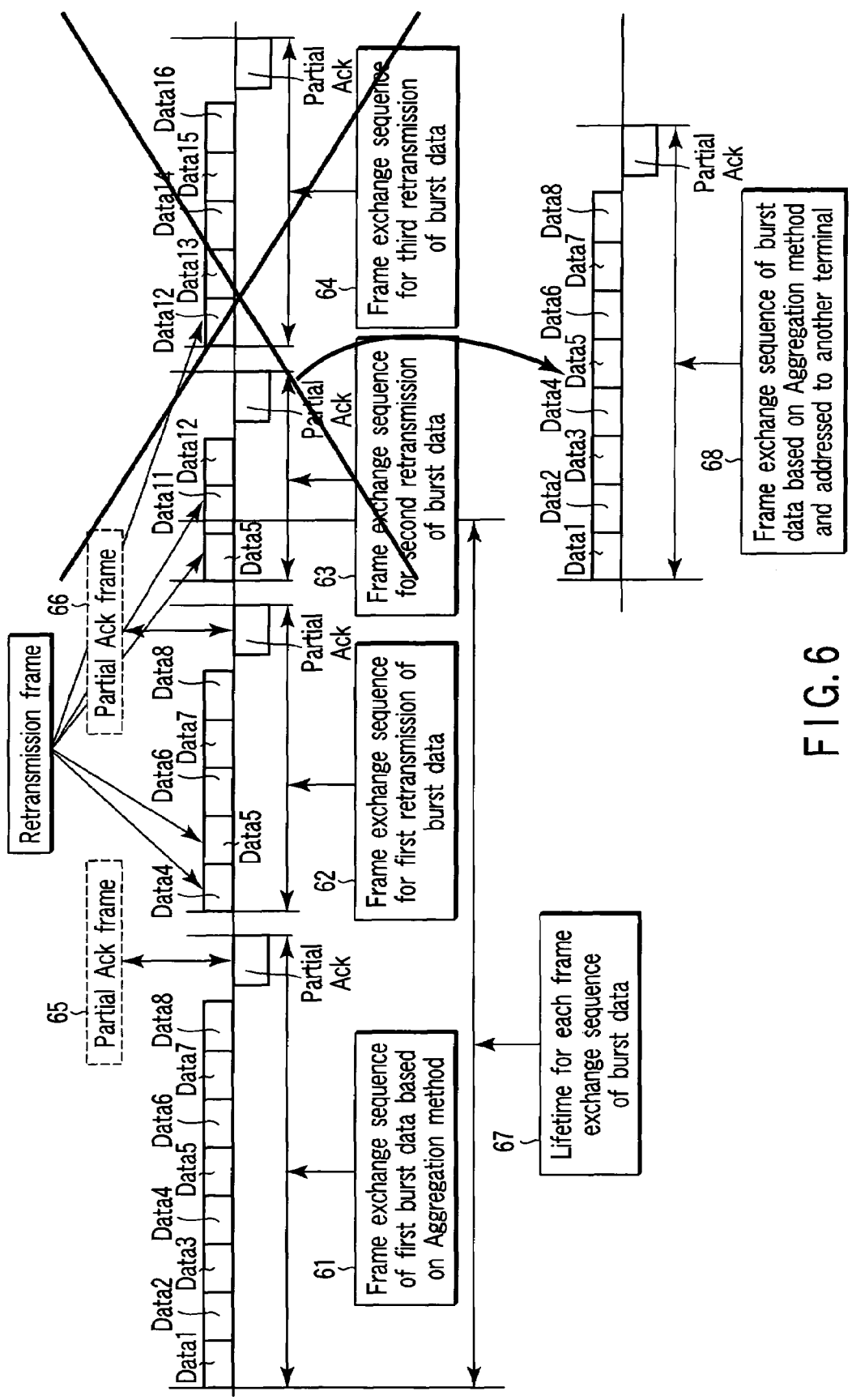
FIG. 6 is a view for explaining a retransmission limiting method using the lifetime for each frame exchange sequence of burst data when the burst data is retransmitted by the aggregation method.

FIG. 5 is a view showing a burst data retransmission method based on the aggregation method. FIG. 6 is a view showing a retransmission limiting method which uses the lifetime for each frame exchange sequence of burst data when the burst data is to be retransmitted by the aggregation method.

A method of retransmitting burst data by burst transmission based on the aggregation method will be explained with reference to FIGS. 1 and 5. In this embodiment, a maximum value of the number of aggregation data in a MAC frame in the form of an aggregation frame is eight. However, the number of data which can be put in an aggregation frame need not be limited to eight. That is, the number of data which can be put in an aggregation frame can be increased if the bit map of a Partial Ack frame is sufficient. It is also possible to increase the bit map if it is insufficient.

In a frame exchange sequence 51 of first burst data based on the aggregation method, a burst data transmitting terminal aggregates eight MAC frames from Data 1 to Data 8 in a transmission queue of a transmission data manager 11 into one MAC frame, adds one PHY header to the aggregated MAC frame, and transmits the obtained frame as burst data (an aggregation frame) based on the aggregation method. A burst data receiving terminal receives the burst data based on the aggregation method and, after the elapse of SIFS, returns a Partial Ack frame 55 as an acknowledgement frame of the burst data based on the aggregation method. If the burst data receiving terminal can normally receive Data 1, Data 2, Data 3, Data 6, Data 7, and Data 8 but cannot receive Data 4 and Data 5 in the frame exchange sequence 51 of the first burst data, the bit map of the Partial Ack frame 55 indicates that Data 1, Data 2, Data 3, Data 6, Data 7, and Data 8 are normally received. The burst data transmitting terminal having received the Partial Ack frame 55 recognizes from its bit map that the transmission of Data 4 and Data 5 has failed, and performs first retransmission of the burst data by the aggregation method.

In a frame exchange sequence 52 of the first retransmission of the burst data, the burst data transmitting terminal counts up the numbers of times of retransmission of Data 4 and Data 5, and confirms that the number of times of retransmission of each of Data 4 and Data 5 has not reached the upper limit of the number of times of retransmission of the data, and that the lifetime of each of Data 4 and Data 5 has not expired. The burst data transmitting terminal then sets retry bits of Data 4 and Data 5, fetches three new data frames Data 9, Data 10, and Data 11 from the transmission queue of the transmission data manager 11, and aggregates a total of five MAC frames into one MAC frame. The burst data transmitting terminal adds one PHY header to the aggregated MAC frame, and transmits the obtained frame as burst data (an aggregation frame) based on the aggregation method. The burst data receiving terminal receives the burst data based on the aggregation method and, after the elapse of SIFS, returns a Partial Ack frame 56 as an acknowledgement frame of the burst data based on the aggregation method. If the burst data receiving terminal can normally receive Data 4, Data 9, and Data 10 but cannot receive Data 5 and Data 11 in the frame exchange sequence 52 of the first retransmission of the burst data, the bit map of the Partial Ack frame 56 indicates that Data 4, Data 9, and Data 10 are normally received. The burst data transmitting terminal having received the Partial Ack frame 56 recognizes from its bit map that the transmission of Data 5 and Data 11 has failed, and performs second retransmission of the burst data by the aggregation method.

In a frame exchange sequence 53 of the second retransmission of the burst data, the burst data transmitting terminal counts up the numbers of times of retransmission of Data 5 and Data 11, and confirms that the number of times of retransmission of each of Data 5 and Data 11 has not reached the upper limit of the number of times of retransmission of the data, and that the lifetime of each of Data 5 and Data 11 has not expired. The burst data transmitting terminal then sets retry bits of Data 5 and Data 11, fetches one new data frame Data 12 from the transmission queue of the transmission data manager 11, and aggregates a total of three MAC frames into one MAC frame. The burst data transmitting terminal adds a PHY header to the aggregated MAC frame, and transmits the obtained frame as burst data (an aggregation frame) based on the aggregation method. The burst data receiving terminal receives the burst data based on the aggregation method and, after the elapse of SIFS, returns a Partial Ack frame 57 as an acknowledgement frame of the burst data based on the aggregation method. If the burst data receiving terminal can normally receive Data 5 and Data 11 but cannot receive Data 12 in the frame exchange sequence 53 of the second retransmission of the burst data, the bit map of the Partial Ack frame 57 indicates that Data 5 and Data 11 are normally received. The burst data transmitting terminal having received the Partial Ack frame 57 recognizes from its bit map that the transmission of Data 12 has failed, and performs third retransmission of the burst data by the aggregation method.

As in the first embodiment, the interval between burst data frame exchange sequences when they are retransmitted can be a PIFS interval if a burst data transmission source is a wireless base station and a transmission destination is a wireless terminal station. During the TXOP period of EDCA or HCCA defined in the IEEE 802.11e, it is also possible to transmit data at PIFS intervals or SIFS intervals, or to perform backoff by CSMA/CA.

The problem described in the first embodiment arises if retransmission limitation using the number of times of retransmission and the lifetime of each transmission data is performed as data retransmission limitation when burst transmission based on the aggregation method is performed.

To solve the above problem, when burst data is to be retransmitted by the aggregation method, a retransmission limiting method according to the present invention uses the lifetime for each frame exchange sequence of the burst data. An embodiment based on this retransmission limiting method will be explained below with reference to FIGS. 1 and 6.

When a frame exchange sequence 61 of first burst data based on the aggregation method is started, an access controller 12 of a wireless communication apparatus 15 sets (starts) a timer of lifetime 67 for each frame exchange sequence of the burst data. A burst data transmitting terminal aggregates eight MAC frames from Data 1 to Data 8 in a transmission queue of the transmission data manager 11 into one MAC frame, adds one PHY header to the aggregated MAC frame, and transmits the obtained frame as burst data (an aggregation frame) based on the aggregation method. A burst data receiving terminal receives the burst data based on the aggregation method and, after the elapse of SIFS, returns a Partial Ack frame 65 as an acknowledgement frame of the burst data based on the aggregation method. If the burst data receiving terminal can normally receive Data 1, Data 2, Data 3, Data 6, Data 7, and Data 8 but cannot receive Data 4 and Data 5 in the frame exchange sequence 61 of the first burst data, the bit map of the Partial Ack frame 65 indicates that Data 1, Data 2, Data 3, Data 6, Data 7, and Data 8 are normally received. The burst data transmitting terminal having received the Partial Ack frame 65 recognizes from its bit map that the transmission of Data 4 and Data 5 has failed, and causes the access processor 12 to perform the following processing which checks whether first retransmission of the burst data by the aggregation method can be performed.

The access controller 12 checks whether a frame exchange sequence 62 of the first retransmission of the burst data can be transmitted in the remaining time of the timer of the lifetime 67 for each frame exchange sequence of the burst data, the remaining time being set by the access controller 12 when the frame exchange sequence 61 of the first burst data based on the aggregation method is started. If it is determined that the frame exchange sequence of the first retransmission of the burst data can be transmitted in the remaining time of the timer of the lifetime 67 for each frame exchange sequence of the burst data, the first retransmission of the burst data is performed.

In the frame exchange sequence 62 of the first retransmission of the burst data, the burst data transmitting terminal counts up the numbers of times of retransmission of Data 4 and Data 5, and confirms that the number of times of retransmission of each of Data 4 and Data 5 has not reached the upper limit of the number of times of retransmission of the data, and that the lifetime of each of Data 4 and Data 5 has not expired. The burst data transmitting terminal then sets retry bits of Data 4 and Data 5, fetches three new data frames Data 9, Data 10, and Data 11 from the transmission queue of the transmission data manager 11, and aggregates a total of five MAC frames into one MAC frame. The burst data transmitting terminal adds one PHY header to the aggregated MAC frame, and transmits the obtained frame as burst data (an aggregation frame) based on the aggregation method. The burst data receiving terminal receives the burst data based on the aggregation method and, after the elapse of SIFS, returns a Partial Ack frame 66 as an acknowledgement frame of the burst data based on the aggregation method. If the burst data receiving terminal can normally receive Data 4, Data 9, and Data 10 but cannot receive Data 5 and Data 11 in the frame exchange sequence 62 of the first retransmission of the burst data, the bit map of the Partial Ack frame 66 indicates that Data 4, Data 9, and Data 10 are normally received. The burst data transmitting terminal having received the Partial Ack frame 66 recognizes from its bit map that the transmission of Data 5 and Data 11 has failed, and causes the access processor 12 to perform the following processing which checks whether second retransmission of the burst data by the aggregation method can be performed.

The access controller 12 checks whether a frame exchange sequence 63 of the second retransmission of the burst data can be transmitted in the remaining time of the timer of the lifetime 67 for each frame exchange sequence of the burst data, the remaining time being set by the access controller 12 when the frame exchange sequence 61 of the first burst data based on the aggregation method is started. If, as shown in FIG. 6, it is determined that the frame exchange sequence 63 of the second retransmission of the burst data cannot be transmitted in the remaining time of the timer of the lifetime 67 for each frame exchange sequence of the burst data, the burst data retransmission process is interrupted, and the operation advances to a process of transmitting burst data to another terminal on the basis of the aggregation method by a frame exchange sequence 68 of the burst data. This operation after the burst data retransmission is interrupted need not be limited to the process of transmitting burst data to another terminal on the basis of the aggregation method. That is, the operation may also advance to, e.g., burst data transmission to another priority of the same terminal by the aggregation method, burst data transmission to another terminal by a method other than the aggregation method (e.g., the Block Ack method of the IEEE 802.11e), burst data transmission to another priority of the same terminal by a method other than the aggregation method (e.g., the Block Ack method of the IEEE 802.11e), downlink TXOP transmission from a base station to a terminal by the HCCA method of the IEEE 802.11e, QoS Cf-Poll frame transmission which starts uplink TXOP transmission by the HCCA method of the IEEE 802.11e, or data transmission by the CSMA/CA access method such as the DCF method of the IEEE 802.11 or the EDCA method of the IEEE 802.11e.

Also, when the access controller 12 checks whether the frame exchange sequence 63 of the second retransmission of the burst data can be transmitted on the basis of the remaining time of the timer of the lifetime 67 for each frame exchange sequence of the burst data, even though the frame exchange sequence 63 of the second retransmission of the burst data cannot be entirely transmitted, data transmission within the transmittable range can be performed depending on the remaining time of the timer of the lifetime 67 for each frame exchange sequence of the burst data, if, for example, there is a time remaining during which Data 5 and Data 11 found by the bit map of the Partial Ack frame 66 to have been unsuccessfully transmitted can be transmitted by the aggregation method and a Partial Ack frame can be received, there is a time remaining during which Data 5 and Data 11 can be transmitted by Block Ack Policy and a Block Ack Request frame and Block Ack frame can be exchanged, there is a time remaining during which Data 5 and Data 6 can be transmitted and received by Normal Ack, or there is a time remaining during which only Data 5 can be transmitted and received by Normal Ack.

As described above, transmission data which cannot be retransmitted due to the remaining time of the timer of the lifetime 67 for each frame exchange sequence of burst data is returned to the transmission data manager 11 of the wireless communication apparatus 15, and whether to discard the transmission data is determined by using the number of times of retransmission and the lifetime uniquely managed for the transmission data. Even though the timer of the lifetime 67 for each frame exchange sequence of the burst data has expired, if the number of times of retransmission uniquely managed for the transmission data has not exceeded the upper limit of the number of times of retransmission, and if the lifetime uniquely managed for the transmission data has not expired, the transmission data is returned to the transmission queue of the transmission data manager 11. If the number of times of retransmission uniquely managed for the transmission data has exceeded the upper limit of the number of times of retransmission, or if the lifetime uniquely managed for the transmission data has expired, the data is discarded without being returned to the transmission queue.

In this embodiment as described above, retransmission of burst data by burst transmission can be limited for each frame exchange sequence of the burst data, so scheduling calculations can be performed by taking account of burst data retransmission. Also, a necessary band can be ensured for a QoS request which changes from one terminal to another or from one application to another.

Fourth Embodiment

The fourth embodiment is basically the same as the third embodiment except that in burst data retransmission limitation in the third embodiment, the number of times of retransmission for each frame exchange sequence of burst data is used instead of the lifetime 67 for each frame exchange sequence of burst data. Therefore, differences from the third embodiment will be mainly described below. The basic configuration of a wireless communication apparatus is the same as shown in FIG. 1.

FIG. 7 is a view showing a method of performing retransmission limitation by using the number of times of retransmission for each frame exchange sequence of burst data when the burst data is to be retransmitted by the aggregation method.

The problem described in the first embodiment arises if retransmission limitation using the number of times of retransmission and the lifetime of each transmission data is performed as data retransmission limitation when burst transmission is performed by the aggregation method.

To solve the above problem, when burst data is to be retransmitted by the aggregation method, a retransmission limiting method according to the present invention uses the number of times of retransmission for each frame exchange sequence of the burst data. An embodiment based on this retransmission limiting method will be explained below with reference to FIGS. 1 and 7.

In this embodiment, the upper limit of the number of times of retransmission for each frame exchange sequence of burst data is two, and burst data is retransmitted only once. However, the upper limit of the number of times of retransmission for each frame exchange sequence of burst data is not limited to two. That is, the upper limit may also be increased or no transmission need be performed at all depending on the form of use.

When a frame exchange sequence 71 of first burst data based on the aggregation method is started, an access controller 12 of a wireless communication apparatus 15 initializes the number of times of retransmission for each frame exchange sequence of the burst data (i.e., sets the number of times of retransmission to 0). A burst data transmitting terminal aggregates eight MAC frames from Data 1 to Data 8 in a transmission queue of a transmission data manager 11 into one MAC frame, adds one PHY header to the aggregated MAC frame, and transmits the obtained frame as burst data (an aggregation frame) based on the aggregation method. A burst data receiving terminal receives the burst data based on the aggregation method and, after the elapse of SIFS, returns a Partial Ack frame 75 as an acknowledgement frame of the burst data based on the aggregation method. If the burst data receiving terminal can normally receive Data 1, Data 2, Data 3, Data 6, Data 7, and Data 8 but cannot receive Data 4 and Data 5 in the frame exchange sequence 71 of the first burst data, the bit map of the Partial Ack frame 75 indicates that Data 1, Data 2, Data 3, Data 6, Data 7, and Data 8 are normally received. The burst data transmitting terminal having received the Partial Ack frame 75 recognizes from its bit map that the transmission of Data 4 and Data 5 has failed, and causes the access processor 12 to check whether first retransmission of the burst data by the aggregation method can be performed.

The access controller 12 counts up the number of times of retransmission for each frame exchange sequence of the burst data from 0 to 1, and checks whether the number of times of retransmission for each frame exchange sequence of the burst data has exceeded two, which is the upper limit of the number of times of retransmission for each frame exchange sequence of the burst data. Since the number of times of retransmission for each frame exchange sequence of the burst data has not exceeded two as the upper limit of the number of times of retransmission, the first retransmission of the burst data is performed.

In a frame exchange sequence 72 of the first retransmission of the burst data, the burst data transmitting terminal counts up the numbers of times of retransmission of Data 4 and Data 5, and confirms that the number of times of retransmission of each of Data 4 and Data 5 has not reached the upper limit of the number of times of retransmission of the data, and that the lifetime of each of Data 4 and Data 5 has not expired. The burst data transmitting terminal then sets retry bits of Data 4 and Data 5, fetches three new data frames Data 9, Data 10, and Data 11 from the transmission queue of the transmission data manager 11, and aggregates a total of five MAC frames into one MAC frame. The burst data transmitting terminal adds one PHY header to the aggregated MAC frame, and transmits the obtained frame as burst data (an aggregation frame) based on the aggregation method. The burst data receiving terminal receives the burst data based on the aggregation method and, after the elapse of SIFS, returns a Partial Ack frame 76 as an acknowledgement frame of the burst data based on the aggregation method. If the burst data receiving terminal can normally receive Data 4, Data 9, and Data 10 but cannot receive Data 5 and Data 11 in the frame exchange sequence 72 of the first retransmission of the burst data, the bit map of the Partial Ack frame 76 indicates that Data 4, Data 9, and Data 10 are normally received. The burst data transmitting terminal having received the Partial Ack frame 76 recognizes from its bit map that the transmission of Data 5 and Data 11 has failed, and causes the access processor 12 to check whether second retransmission of the burst data by the aggregation method can be performed.

The access controller 12 counts up the number of times of retransmission for each frame exchange sequence of the burst data from 1 to 2, and checks whether the number of times of retransmission for each frame exchange sequence of the burst data has exceeded two, which is the upper limit of the number of times of retransmission for each frame exchange sequence of the burst data. Since the number of times of retransmission for each frame exchange sequence of the burst data is equal to two as the upper limit of the number of times of retransmission, the burst data retransmission process is interrupted, and the operation advances to a process of transmitting burst data to another terminal on the basis of the aggregation method by a frame exchange sequence 77 of the burst data. This operation after the burst data retransmission is interrupted need not be limited to the process of transmitting burst data to another terminal on the basis of the aggregation method. That is, the operation may also advance to, e.g., burst data transmission to another priority of the same terminal by the aggregation method, burst data transmission to another terminal by a method other than the aggregation method (e.g., the Block Ack method of the IEEE 802.11e), burst data transmission to another priority of the same terminal by a method other than the aggregation method (e.g., the Block Ack method of the IEEE 802.11e), downlink TXOP transmission from a base station to a terminal by the HCCA method of the IEEE 802.11e, QoS Cf-Poll frame transmission which starts uplink TXOP transmission by the HCCA method of the IEEE 802.11e, or data transmission by the CSMA/CA access method such as the DCF method of the IEEE 802.11 or the EDCA method of the IEEE 802.11e.

As described above, transmission data which cannot be retransmitted because the number of times of retransmission for each frame exchange sequence of burst data is exceeded is returned to the transmission data manager 11 of the wireless communication apparatus 15, and whether to discard the transmission data is determined by using the number of times of retransmission and the lifetime uniquely managed for the transmission data. Even though the upper limit of the number of times of retransmission for each frame exchange sequence of the burst data is exceeded, if the number of times of retransmission uniquely managed for the transmission data has not exceeded the upper limit of the number of times of retransmission, and if the lifetime uniquely managed for the transmission data has not expired, the transmission data is returned to the transmission queue of the transmission data manager 11. If the number of times of retransmission uniquely managed for the transmission data has exceeded the upper limit of the number of times of retransmission, or if the lifetime uniquely managed for the transmission data has expired, the data is discarded without being returned to the transmission queue.

In this embodiment as described above, retransmission of burst data by burst transmission can be limited for each frame exchange sequence of the burst data, so scheduling calculations can be performed by taking account of burst data retransmission. Also, a necessary band can be ensured for a QoS request which changes from one terminal to another or from one application to another.

Fifth Embodiment

This embodiment can be practiced in combination with each of the first to fourth embodiments described above, and relates to frame exchange of burst data.

Figure 8:
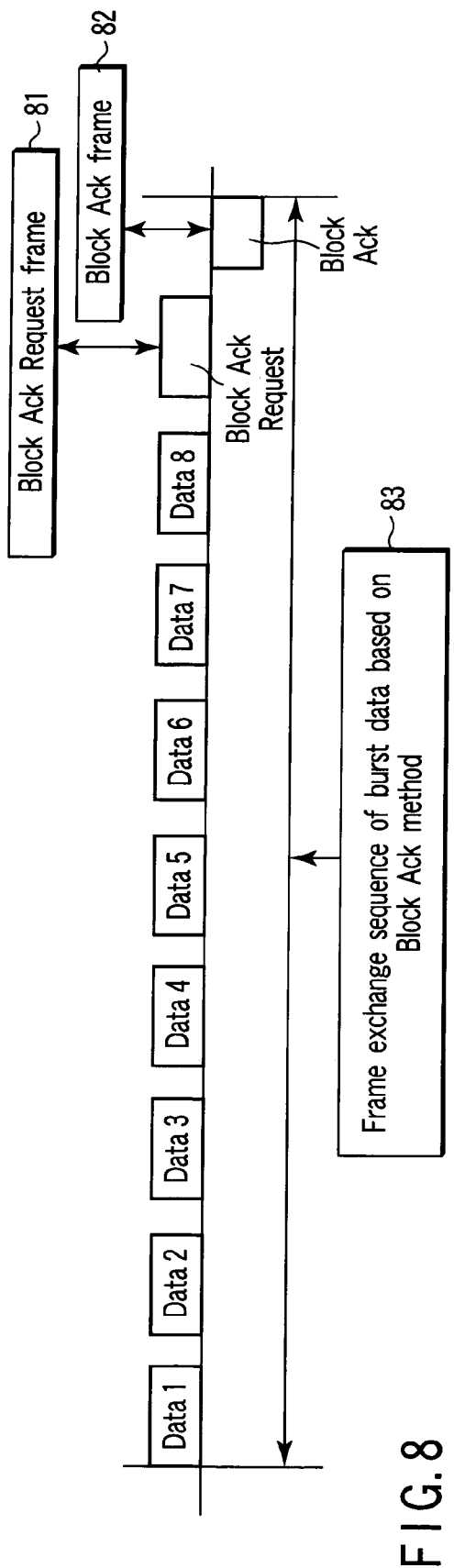
FIG. 8 is a view for explaining the Block Ack method defined in the IEEE 802.11e as burst data frame exchange.
Figure 9:
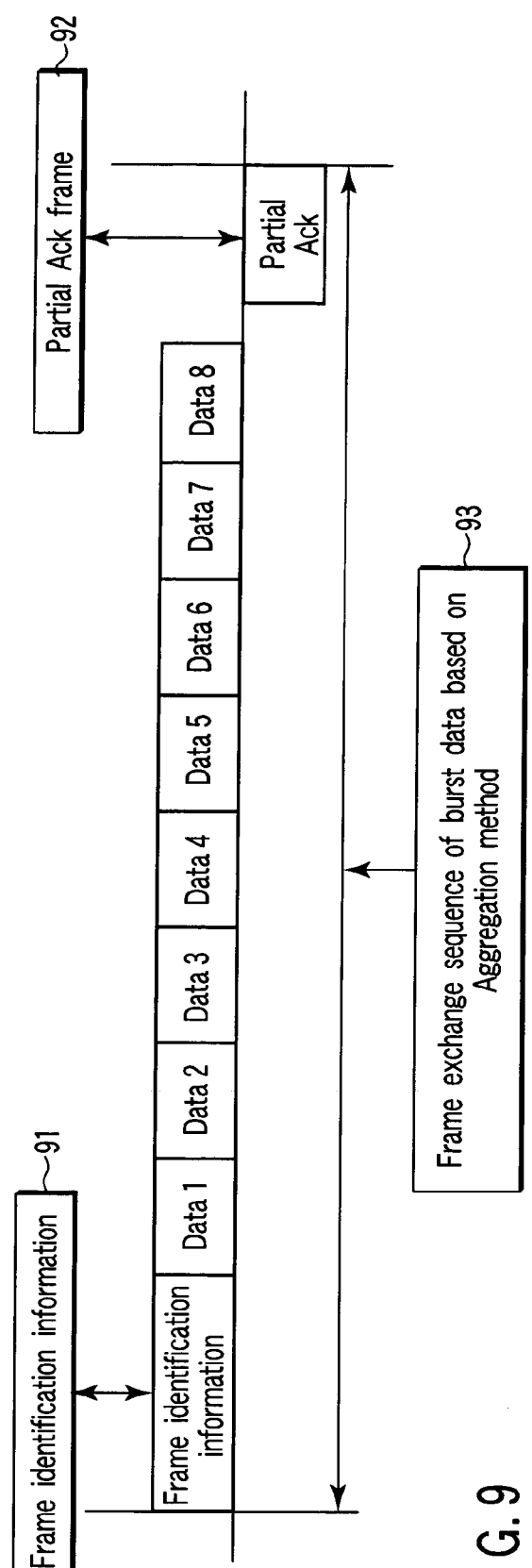
FIG. 9 is a view for explaining burst data frame exchange based on the aggregation method.
Figure 10:
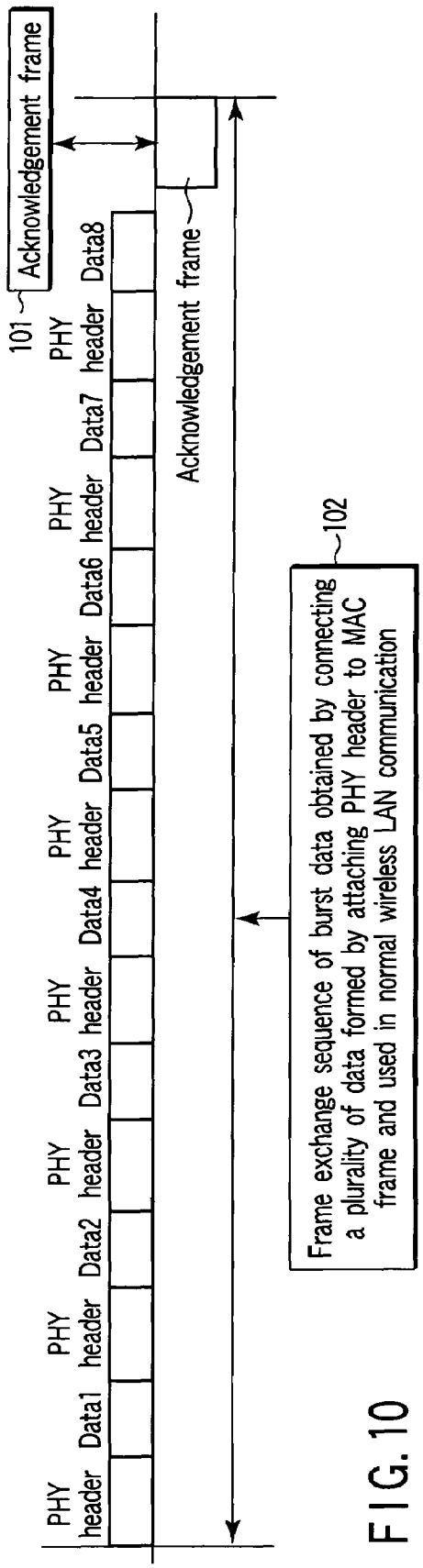
FIG. 10 is a view for explaining, as burst data frame exchange, a method by which a plurality of transmission data output from the conventional wireless communication apparatus are aggregated and transmitted by burst transmission.
Figure 11:
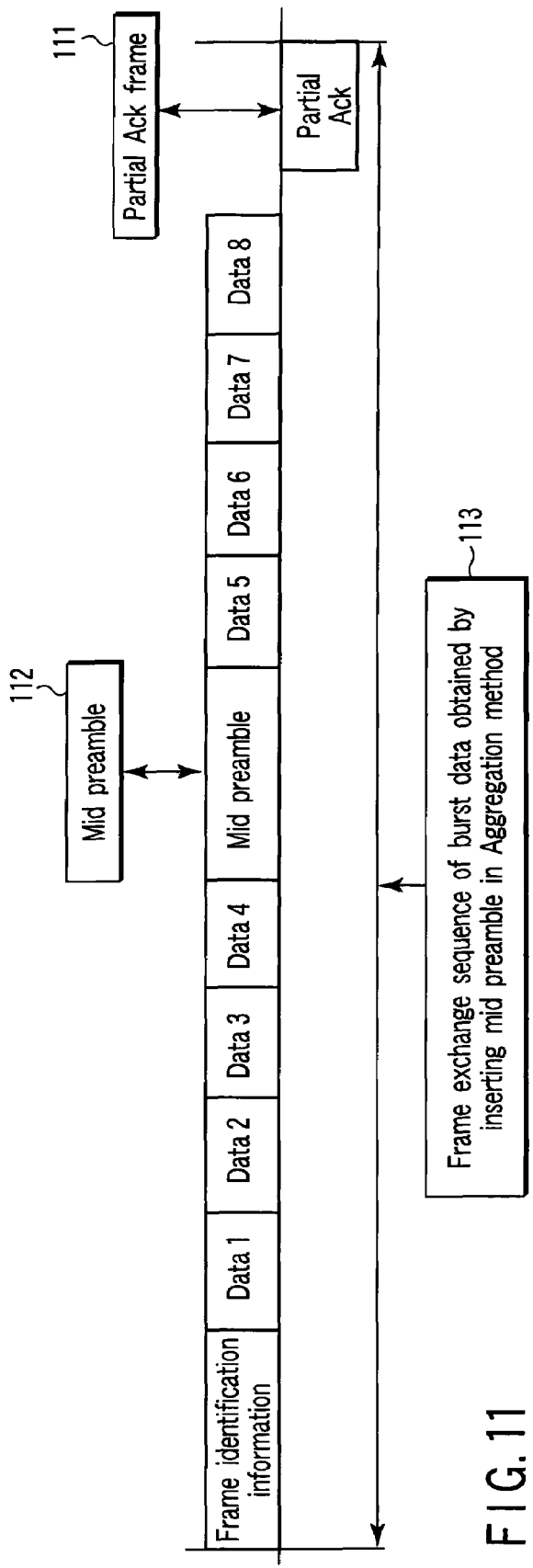
FIG. 11 is a view showing burst data frame exchange when a mid preamble is inserted in the aggregation method.
Figure 12:
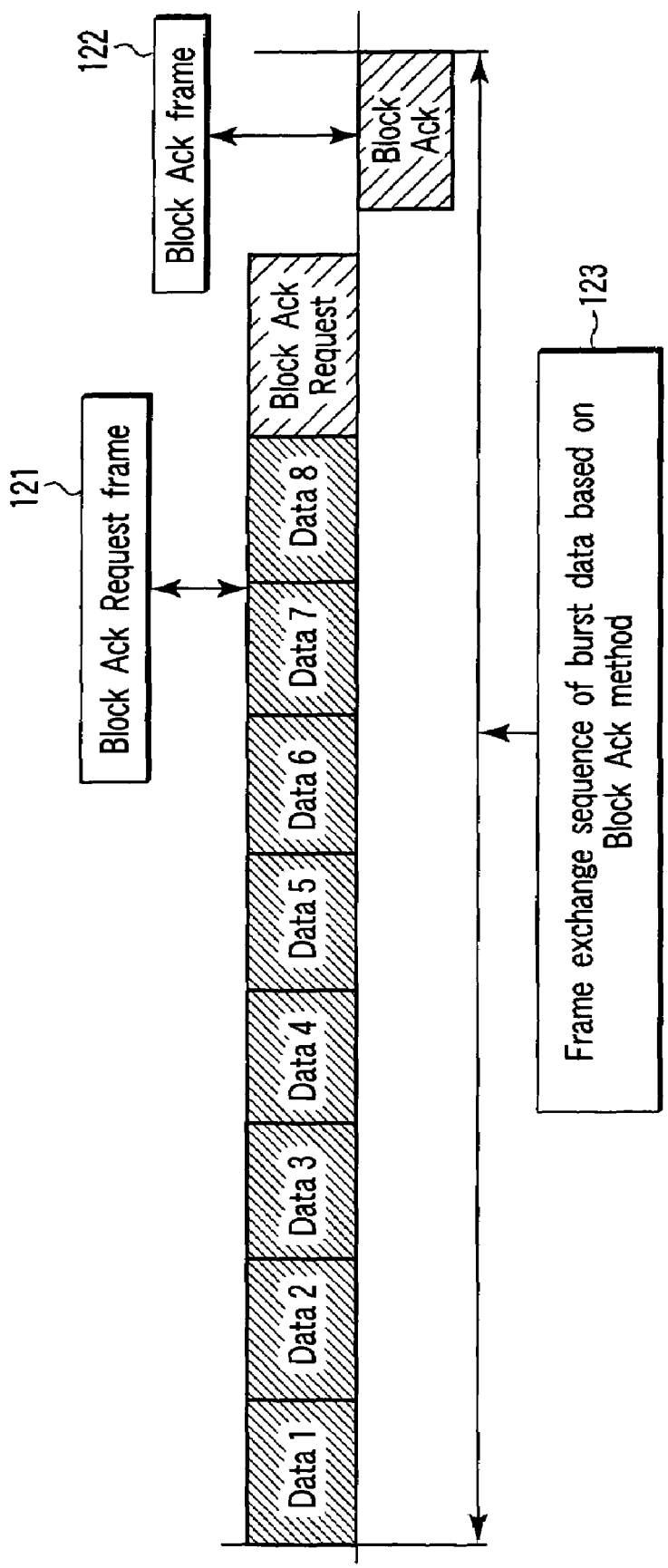
FIG. 12 is a view showing burst data frame exchange in which SIFS intervals between data frames and a Block Ack Request frame are shortened when burst data is transmitted by the Block Ack method.

FIG. 8 is a view for explaining the Block Ack method defined in the IEEE 802.11e as burst data frame exchange. FIG. 9 is a view for explaining burst data frame exchange using the aggregation method. FIG. 10 is a view for explaining, as burst data frame exchange, a method by which a plurality of transmission data output from the conventional wireless communication apparatus are aggregated and transmitted by burst transmission. FIG. 11 is a view showing burst data frame exchange when a mid preamble is inserted in the aggregation method. FIG. 12 is a view showing burst data frame exchange by which SIFS intervals between data frames and a Block Ack Request frame are shortened when burst data is to be transmitted by the Block Ack method.

As shown in FIG. 8, when the Block Ack method defined in the IEEE 802.11e is to be used as burst data frame exchange, a burst data transmitting terminal transmits transmission data in the order of Data 1, Data 2, Data 3, Data 4, Data 5, Data 6, Data 7, and Data 8 at SIFS intervals. After the elapse of SIFS after the transmission of Data 8, the burst data transmitting terminal transmits a Block Ack Request frame 81 to request an acknowledgement of the transmission data. A burst data receiving terminal receives the Block Ack Request frame 81 and, after the elapse of SIFS, returns the data reception status by a Block Ack frame 82. The burst data transmitting terminal refers to the Block Ack frame 82, and retransmits the burst data by using any of the first to fourth embodiments. Note that the transmission data indicated by Data 1, Data 2, Data 3, Data 4, Data 5, Data 6, Data 7, and Data 8 in FIG. 8 is data obtained by attaching a PHY header to a MAC frame, and output from a wireless communication apparatus in normal wireless LAN communication.

When the aggregation method is to be used as burst data frame exchange, MAC frames of wireless LAN communication are aggregated as indicated by Data 1, Data 2, Data 3, Data 4, Data 5, Data 6, Data 7, and Data 8 shown in FIG. 9. Frame identification information 91 including the frame lengths of the aggregated MAC frames, a PHY header, and a PHY preamble is attached to the head of a frame obtained by aggregating the MAC frames, and the obtained aggregation frame is transmitted. After the elapse of SIFS of the aggregation frame, a burst data receiving terminal notifies MAC frames which can be received among other MAC frames in the aggregation frame, by using a Partial Ack frame 92 as an acknowledgement frame. A burst data transmitting terminal refers to the Partial Ack frame 92, and retransmits the burst data by using any of the first to fourth embodiments.

When a method by which a plurality of transmission data output from the conventional wireless communication apparatus are aggregated and transmitted by burst transmission is used as burst data frame exchange, one burst data is formed by aggregating a plurality of data used in normal wireless LAN communication and obtained by attaching PHY headers to MAC frames of wireless LAN communication, as indicated by Data 1, Data 2, Data 3, Data 4, Data 4, Data 5, Data 6, Data 7, and Data 8 shown in FIG. 10. This burst data is transmitted from a burst data transmitting terminal. After the elapse of SIFS, a burst data receiving terminal returns the reception status by an acknowledgement frame 101. The acknowledgement frame 101 may be a Partial Ack frame of the aggregation method, or an acknowledgement frame of another method such as the Block Ack method. The burst data transmitting terminal having received the acknowledgement frame 101 refers to the acknowledgement frame 101, and retransmits the burst data by using any of the first to fourth embodiments.

In a method which inserts a mid preamble in the aggregation method, a mid preamble 112 for correcting a signal distorted when the frame length of burst data is long is inserted in the middle of a plurality of MAC frames of burst data formed by the aggregation method, and the obtained burst data frame is transmitted. After the elapse of SIFS, a burst data receiving terminal notifies a Partial Ack frame 111 as an acknowledgement. A burst data transmitting terminal retransmits the burst data by using the Partial Ack frame 111.

In a method which transmits burst data on the basis of the Block Ack method by shortening SIFS intervals between data frames and a Block Ack Request frame, transmission data is aggregated as indicated by Data 1, Data 2, Data 3, Data 4, Data 5, Data 6, Data 7, and Data 8 shown in FIG. 12 by the Block Ack method described in the IEEE 802.11e, a Block Ack Request Frame 121 is aggregated to the end of the transmission data, and the obtained frame is transmitted. After the elapse of SIFS, a Block Ack frame 122 is received as an acknowledgement of burst transmission. A burst data transmitting terminal retransmits the burst data by using the bit map of the Block Ack frame 122.

In burst data transmission described in this embodiment, one burst data can contain data addressed to only one terminal, and can also contain data addressed to a plurality of terminals. Also, when transmission data is distributed in accordance with data types, e.g., priorities, one burst data can contain only one data type addressed to one terminal, different data types addressed to one terminal, only one data type addressed to different terminals, or different data types addressed to different terminals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:
 a transmitting device configured to transmit a plurality of aggregation frames to a destination terminal in respective frame exchange sequences, the aggregation frames each including a plurality of media access control (MAC) frames and frame identification information including frame lengths of the plurality of MAC frames;
 a receiving device configured to receive an acknowledgement frame of the aggregation frames transmitted from the destination terminal;
 a control device including a timer which sets a first lifetime for each of the frame exchange sequences at a time of starting transmission of the aggregation frames, and measures remaining time, the control device being configured to:
  detect whether transmission of each of the MAC frames contained in a first one of the aggregation frames has failed, from the acknowledgement frame received by the receiving device, and
  perform a control for causing, when it is determined from the remaining time of the first lifetime that it is possible to transmit a second one of aggregation frames containing a MAC frame which has failed in transmission and a MAC frame to be newly transmitted, the transmitting device to transmit the second one of the aggregation frames; and
 a transmission data management device configured to determine whether or not to discard the MAC frame which has failed in transmission, based on a second lifetime or a retransmission count which are managed in units of one MAC frame,
 wherein when it is determined from the remaining time of the first lifetime that it is impossible to transmit the second one of the aggregation frames, the control device interrupts processing for retransmission of the MAC frame which has failed in transmission, and causes the transmitting device to transmit a third one of the aggregation frames to one of the destination terminal and another destination terminal, and
 when the second lifetime or the retransmission count of the MAC frame, which has failed in transmission exceeds an upper limit of the second lifetime or the retransmission count, the MAC frame which has failed in transmission is discarded.

2. An apparatus according to claim 1, wherein from the remaining time of the first lifetime, when it is determined that it is impossible to transmit the second aggregation frame, and it is also determined that it is possible to transmit the MAC frame which has failed in transmission, the control device performs a control for causing the transmitting device to retransmit the MAC frame which has failed in transmission.

3. An apparatus according to claim 1
 wherein the transmission data management device determines whether or not to discard the MAC frame which has failed in transmission, based on both the second lifetime and the retransmission count which are managed in units of one MAC frame, and
 when at least one of the second lifetime and the retransmission count exceeds an upper limit of the second lifetime and the retransmission count, the MAC frame which has failed in transmission is discarded.

4. An apparatus according to claim 3, wherein neither the second lifetime and the retransmission count of the MAC frame which has failed in transmission exceeds the upper limit, the MAC frame which has failed in transmission is returned to a transmission queue which stores data transmitted by the transmitting device.

5. A wireless communication apparatus comprising:
a transmitting device configured to transmit a plurality of aggregation frames to a destination terminal in respective frame exchange sequences, the aggregation frames each including a plurality of media access control (MAC) frames and frame identification information including frame lengths of the plurality of MAC frames;
a receiving device configured to receive an acknowledgement frame of the aggregation frames transmitted from the destination terminal;
a control device configured to set an upper limit value of a first retransmission count for each of the frame exchange sequences at a time of starting transmission of the aggregation frames, detect whether each of the MAC frames contained in the first one of the aggregation frames has failed, from the acknowledgement frame received by the receiving device, and cause, when the first retransmission count for said each of the frame exchange sequences does not reach the upper limit value, the transmitting device to transmit a second one of the aggregation frames containing a MAC frame which has failed in transmission and a MAC frame to be newly transmitted;
a transmission data management device configured to determine whether or not to discard the MAC frame which has failed in transmission, based on a lifetime or a second retransmission count which are managed in units of one MAC frame,
wherein when the first retransmission count for said each of the frame exchange sequences reaches the upper limit value, the control device interrupts processing for retransmission of the MAC frame which has failed in transmission, and performs a control for causing the transmitting device to transmit a third one of the aggregation frames to one of the destination terminal and another destination terminal, and
when the lifetime or the second retransmission count of the MAC frame, which has failed in transmission exceeds an upper limit of the lifetime or the second retransmission count, the MAC frame which has failed in transmission is discarded.

6. An apparatus according to claim 1 or 5, wherein
each of the aggregation frames includes the frame identification information and a plurality of MAC frames in each of which a physical header of a MAC frame to identify a wireless communication method is omitted, and wherein the frame identification information identifies the wireless communication method and indicates how the MAC frames are aggregated based on the frame lengths.

7. An apparatus according to any one of claims 1 and 5, wherein the each of the aggregation frames contains a mid preamble for correcting signal distortion.

8. An apparatus according to claim 5, wherein the transmission data management device determines whether or not to discard the MAC frame which has failed in transmission, based on both the lifetime and the second retransmission count which are managed in units of one MAC frame, and
when at least one of the lifetime and the second retransmission count exceeds an upper limit of the lifetime and the second retransmission count, the MAC frame which has failed in transmission is discarded.

9. An apparatus according to claim 8, wherein neither the lifetime and the second retransmission count of the MAC frame which has failed in transmission exceeds the upper limit, the MAC frame which has failed in transmission is returned to a transmission queue which stores data transmitted by the transmitting device.

10. A wireless communication apparatus comprising:
a transmitting device configured to transmit a plurality of aggregation frames to a destination terminal in respective frame exchange sequences, the aggregation frames each including a plurality of media access control (MAC) frames and frame identification information including frame lengths of the plurality of MAC frames;
a receiving device configured to receive an acknowledgement frame of the aggregation frames transmitted from the destination terminal;
a control device including a timer which sets a first lifetime for each of the frame exchange sequences at a time of starting transmission of the aggregation frames, and measures remaining time, the control device being configured to:
    detect whether transmission of each of the MAC frames contained in a first one of the aggregation frames has failed, from the acknowledgement frame received by the receiving device, and
    perform a control for causing, when it is determined from the remaining time of the first lifetime that it is possible to transmit a second one of aggregation frames containing a MAC frame which has failed in transmission, the transmitting device to transmit the second one of the aggregation frames; and
a transmission data management device configured to determine whether or not to discard the MAC frame which has failed in transmission, based on a second lifetime or a retransmission count which are managed in units of one MAC frame,
wherein when it is determined from the remaining time of the first lifetime that it is impossible to transmit the second one of the aggregation frames, the control device interrupts processing for retransmission of the MAC frame which has failed in transmission, and causes the transmitting device to transmit a third one of the aggregation frames to one of the destination terminal and another destination terminal, and
when the second lifetime or the retransmission count of the MAC frame, which has failed in transmission exceeds an upper limit of the second lifetime or the retransmission count, the MAC frame which has failed in transmission is discarded.

11. A wireless communication apparatus comprising:
a transmitting device configured to transmit a plurality of aggregation frames to a destination terminal in respective frame exchange sequences, the aggregation frames each including a plurality of media access control (MAC) frames and frame identification information including frame lengths of the plurality of MAC frames;
a receiving device configured to receive an acknowledgement frame of the aggregation frames transmitted from the destination terminal;
a control device configured to:
    set an upper limit value of a first retransmission count for each of the frame exchange sequences at a time of starting transmission of the aggregation frames,
    detect whether each of the MAC frames contained in a first one of the aggregation frames has failed, from the acknowledgement frame received by the receiving device, and cause, when the first retransmission count for said each of the frame exchange sequences does not reach the upper limit value, the transmitting device to transmit a second one of the aggregation frames containing a MAC frame which has failed in transmission; and a transmission data management device configured to determine whether or not to discard the MAC frame which has failed in transmission, based on a lifetime or a second retransmission count which are managed in units of one MAC frame, wherein when the first retransmission count for said each of the frame exchange sequences reaches the upper limit value, the control device interrupts processing for retransmission of the MAC frame which has failed in transmission, and performs a control for causing the transmitting device to transmit a third one of the aggregation frames to one of the destination terminal and another destination terminal, and when the lifetime or the second retransmission count of the MAC frame, which has failed in transmission exceeds an upper limit of the lifetime or the second retransmission count, the MAC frame which has failed in transmission is discarded.

* * * * *